US010907888B2

United States Patent
Csapos et al.

(10) Patent No.: US 10,907,888 B2
(45) Date of Patent: Feb. 2, 2021

(54) HYBRID PIGMENTED HOT STITCHED COLOR LINER SYSTEM

(71) Applicant: WHIRLPOOL CORPORATION, Benton Harbor, MI (US)

(72) Inventors: Vincent D. Csapos, Hamilton, MI (US); Mario J. Godinho, St. Joseph, MI (US); Muhammad Khizar, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 81 days.

(21) Appl. No.: 16/017,456

(22) Filed: Jun. 25, 2018

(65) Prior Publication Data

US 2019/0390893 A1    Dec. 26, 2019

(51) Int. Cl.
*F25D 23/06* (2006.01)
*B32B 27/32* (2006.01)
(Continued)

(52) U.S. Cl.
CPC ............ *F25D 23/066* (2013.01); *B29C 69/02* (2013.01); *B32B 5/18* (2013.01); *B32B 27/08* (2013.01); *B32B 27/302* (2013.01); *B32B 27/32* (2013.01); *B32B 27/36* (2013.01); *B29C 43/24* (2013.01); *B29C 43/305* (2013.01); *B29K 2023/06* (2013.01); *B29K 2025/06* (2013.01);
(Continued)

(58) Field of Classification Search
CPC ..... F25D 23/066; B32B 27/32; B32B 27/302; B32B 27/36; B32B 5/18; B32B 27/08; B32B 2509/10; B32B 2307/7242; B29C 69/02; B29C 43/305; B29C 43/24; B29C 43/02; B29C 48/0011; B29C 69/00; B29K 2025/06; B29K 2023/06; B29K 2995/002; B29K 2067/003; B29K 2995/0067; B29L 2031/7622
See application file for complete search history.

(56) References Cited

U.S. PATENT DOCUMENTS

| 948,541 A | 2/1910 | Coleman |
|---|---|---|
| 1,275,511 A | 8/1918 | Welch |

(Continued)

FOREIGN PATENT DOCUMENTS

| CA | 626838 A | 5/1961 |
|---|---|---|
| CA | 1320631 | 7/1993 |

(Continued)

OTHER PUBLICATIONS

CN-103407228-A Machine Translation of Description.*
(Continued)

*Primary Examiner* — Christopher T Schatz
*Assistant Examiner* — Cynthia L Schaller
(74) *Attorney, Agent, or Firm* — Price Heneveld LLP

(57) ABSTRACT

A method of making a liner for an appliance is provided. The method includes mixing a polymeric capping layer precursor and a pigment additive to form a color capping layer. The method also includes extruding a polymeric base resin to form a polymeric base layer at a base layer formation temperature. The method further includes laminating the polymeric base layer and the color capping layer to form the liner at about the base layer formation temperature.

17 Claims, 5 Drawing Sheets

(51) Int. Cl.
  B32B 27/30  (2006.01)
  B29C 69/02  (2006.01)
  B32B 27/36  (2006.01)
  B32B 5/18   (2006.01)
  B32B 27/08  (2006.01)
  B29C 43/30      (2006.01)
  B29K 25/00      (2006.01)
  B29L 31/00      (2006.01)
  B29K 67/00      (2006.01)
  B29C 43/24      (2006.01)

(52) U.S. Cl.
  CPC .. *B29K 2067/003* (2013.01); *B29K 2995/002* (2013.01); *B29K 2995/0067* (2013.01); *B29L 2031/7622* (2013.01); *B32B 2307/7242* (2013.01); *B32B 2509/10* (2013.01)

(56) References Cited

U.S. PATENT DOCUMENTS

| | | |
|---|---|---|
| 1,849,369 A | 3/1932 | Frost |
| 1,921,576 A | 8/1933 | Muffly |
| 2,108,212 A | 2/1938 | Schellens |
| 2,128,336 A | 8/1938 | Torstensson |
| 2,164,143 A | 6/1939 | Munters |
| 2,191,659 A | 2/1940 | Hintze |
| 2,318,744 A | 5/1943 | Brown |
| 2,356,827 A | 8/1944 | Coss |
| 2,432,042 A | 12/1947 | Richard |
| 2,439,602 A | 4/1948 | Heritage |
| 2,439,603 A | 4/1948 | Heritage |
| 2,451,884 A | 10/1948 | Stelzer |
| 2,538,780 A | 1/1951 | Hazard |
| 2,559,356 A | 7/1951 | Hedges |
| 2,729,863 A | 1/1956 | Kurtz |
| 2,768,046 A | 10/1956 | Evans |
| 2,817,123 A | 12/1957 | Jacobs |
| 2,942,438 A | 6/1960 | Schmeling |
| 2,985,075 A | 5/1961 | Knutsson-Hall |
| 3,086,830 A | 4/1963 | Malia |
| 3,125,388 A | 3/1964 | Costantini et al. |
| 3,137,900 A | 6/1964 | Carbary |
| 3,218,111 A | 11/1965 | Steiner |
| 3,258,883 A | 7/1966 | Louis et al. |
| 3,290,893 A | 12/1966 | Haldopoulos |
| 3,338,451 A | 8/1967 | Kesling |
| 3,353,301 A | 11/1967 | Heilweil et al. |
| 3,353,321 A | 11/1967 | Heilweil et al. |
| 3,358,059 A | 12/1967 | Snyder |
| 3,379,481 A | 4/1968 | Fisher |
| 3,408,316 A | 10/1968 | Mueller et al. |
| 3,471,416 A | 10/1969 | Fijal |
| 3,597,850 A | 8/1971 | Jenkins |
| 3,607,169 A | 9/1971 | Coxe |
| 3,632,012 A | 1/1972 | Kitson |
| 3,633,783 A | 1/1972 | Aue |
| 3,634,971 A | 1/1972 | Kesling |
| 3,635,536 A | 1/1972 | Lackey et al. |
| 3,670,521 A | 6/1972 | Dodge, III et al. |
| 3,688,384 A | 9/1972 | Mizushima et al. |
| 3,769,770 A | 11/1973 | Deschamps et al. |
| 3,862,880 A | 1/1975 | Feldman |
| 3,868,829 A | 3/1975 | Mann et al. |
| 3,875,683 A | 4/1975 | Waters |
| 3,910,658 A | 10/1975 | Lindenschmidt |
| 3,933,398 A | 1/1976 | Haag |
| 3,935,787 A | 2/1976 | Fisher |
| 4,005,919 A | 2/1977 | Hoge et al. |
| 4,006,947 A | 2/1977 | Haag et al. |
| 4,043,624 A | 8/1977 | Lindenschmidt |
| 4,050,145 A | 9/1977 | Benford |
| 4,067,628 A | 1/1978 | Sherburn |
| 4,170,391 A | 10/1979 | Bottger |
| 4,242,241 A | 12/1980 | Rosen et al. |
| 4,260,876 A | 4/1981 | Hochheiser |
| 4,303,730 A | 12/1981 | Torobin |
| 4,303,732 A | 12/1981 | Torobin |
| 4,325,734 A | 4/1982 | Burrage et al. |
| 4,330,310 A | 5/1982 | Tate, Jr. et al. |
| 4,332,429 A | 6/1982 | Frick |
| 4,396,362 A | 8/1983 | Thompson et al. |
| 4,417,382 A | 11/1983 | Schilf |
| 4,492,368 A | 1/1985 | DeLeeuw et al. |
| 4,529,368 A | 7/1985 | Makansi |
| 4,548,196 A | 10/1985 | Torobin |
| 4,583,796 A | 4/1986 | Nakajima et al. |
| 4,660,271 A | 4/1987 | Lenhardt |
| 4,671,909 A | 6/1987 | Torobin |
| 4,671,985 A | 6/1987 | Rodrigues et al. |
| 4,681,788 A | 7/1987 | Barito et al. |
| 4,745,015 A | 5/1988 | Cheng et al. |
| 4,777,154 A | 10/1988 | Torobin |
| 4,781,968 A | 11/1988 | Kellerman |
| 4,805,293 A | 2/1989 | Buchser |
| 4,865,875 A | 9/1989 | Kellerman |
| 4,870,735 A | 10/1989 | Jahr et al. |
| 4,914,341 A | 4/1990 | Weaver et al. |
| 4,917,841 A | 4/1990 | Jenkins |
| 5,007,226 A | 4/1991 | Nelson |
| 5,018,328 A | 5/1991 | Cur et al. |
| 5,033,636 A | 7/1991 | Jenkins |
| 5,066,437 A | 11/1991 | Barito et al. |
| 5,082,335 A | 1/1992 | Cur et al. |
| 5,084,320 A | 1/1992 | Barito et al. |
| 5,094,899 A | 3/1992 | Rusek, Jr. |
| 5,118,174 A | 6/1992 | Benford et al. |
| 5,121,593 A | 6/1992 | Forslund |
| 5,157,893 A | 10/1992 | Benson et al. |
| 5,168,674 A | 12/1992 | Molthen |
| 5,171,346 A | 12/1992 | Hallett |
| 5,175,975 A | 1/1993 | Benson et al. |
| 5,212,143 A | 5/1993 | Torobin |
| 5,221,136 A | 6/1993 | Hauck et al. |
| 5,227,245 A | 7/1993 | Brands et al. |
| 5,231,811 A | 8/1993 | Andrepont et al. |
| 5,248,196 A | 9/1993 | Lynn et al. |
| 5,251,455 A | 10/1993 | Cur et al. |
| 5,252,408 A | 10/1993 | Bridges et al. |
| 5,263,773 A | 11/1993 | Gable et al. |
| 5,269,601 A * | 12/1993 | Williams ............ F25D 23/066 312/406.1 |
| 5,273,801 A | 12/1993 | Barry et al. |
| 5,318,108 A | 6/1994 | Benson et al. |
| 5,340,208 A | 8/1994 | Hauck et al. |
| 5,353,868 A | 10/1994 | Abbott |
| 5,359,795 A | 11/1994 | Mawby et al. |
| 5,375,428 A | 12/1994 | LeClear et al. |
| 5,397,759 A | 3/1995 | Torobin |
| 5,418,055 A | 5/1995 | Chen et al. |
| 5,433,056 A | 7/1995 | Benson et al. |
| 5,477,676 A | 12/1995 | Benson et al. |
| 5,500,287 A | 3/1996 | Henderson |
| 5,500,305 A | 3/1996 | Bridges et al. |
| 5,505,810 A | 4/1996 | Kirby et al. |
| 5,507,999 A | 4/1996 | Cospey et al. |
| 5,509,248 A | 4/1996 | Dellby et al. |
| 5,512,345 A | 4/1996 | Tsutsumi et al. |
| 5,532,034 A | 7/1996 | Kirby et al. |
| 5,533,311 A | 7/1996 | Tirrell et al. |
| 5,562,154 A | 10/1996 | Benson et al. |
| 5,586,680 A | 12/1996 | Dellby et al. |
| 5,599,081 A | 2/1997 | Revlett et al. |
| 5,600,966 A | 2/1997 | Valence et al. |
| 5,632,543 A | 5/1997 | McGrath et al. |
| 5,640,828 A | 6/1997 | Reeves et al. |
| 5,643,485 A | 7/1997 | Potter et al. |
| 5,652,039 A | 7/1997 | Tremain et al. |
| 5,716,581 A | 2/1998 | Tirrell |
| 5,768,837 A | 6/1998 | Sjoholm |
| 5,792,801 A | 8/1998 | Tsuda et al. |
| 5,813,454 A | 9/1998 | Potter |
| 5,826,780 A | 10/1998 | Messer et al. |
| 5,827,385 A | 10/1998 | Meyer et al. |

(56) References Cited

U.S. PATENT DOCUMENTS

| | | |
|---|---|---|
| 5,834,126 A | 11/1998 | Sheu |
| 5,843,353 A | 12/1998 | De Vos et al. |
| 5,866,228 A | 2/1999 | Awata |
| 5,866,247 A | 2/1999 | Klatt et al. |
| 5,868,890 A | 2/1999 | Fredrick |
| 5,900,299 A | 5/1999 | Wynne |
| 5,918,478 A | 7/1999 | Bostic et al. |
| 5,924,295 A | 7/1999 | Park |
| 5,950,395 A | 9/1999 | Takemasa et al. |
| 5,952,404 A | 9/1999 | Simpson et al. |
| 5,966,963 A | 10/1999 | Kovalaske |
| 5,985,189 A | 11/1999 | Lynn et al. |
| 6,013,700 A | 1/2000 | Asano et al. |
| 6,063,471 A | 5/2000 | Dietrich et al. |
| 6,094,922 A | 8/2000 | Ziegler |
| 6,109,712 A | 8/2000 | Haworth et al. |
| 6,128,914 A | 10/2000 | Tamaoki et al. |
| 6,132,837 A | 10/2000 | Boes et al. |
| 6,158,233 A | 12/2000 | Cohen et al. |
| 6,163,976 A | 12/2000 | Tada et al. |
| 6,164,030 A | 12/2000 | Dietrich |
| 6,164,739 A | 12/2000 | Schulz et al. |
| 6,187,256 B1 | 2/2001 | Asian et al. |
| 6,209,342 B1 | 4/2001 | Banicevic et al. |
| 6,210,625 B1 | 4/2001 | Matsushita et al. |
| 6,220,473 B1 | 4/2001 | Lehman et al. |
| 6,221,456 B1 | 4/2001 | Pogorski et al. |
| 6,224,179 B1 | 5/2001 | Wenning et al. |
| 6,244,458 B1 | 6/2001 | Frysinger et al. |
| 6,260,377 B1 | 7/2001 | Tamaoki et al. |
| 6,266,970 B1 | 7/2001 | Nam et al. |
| 6,294,595 B1 | 9/2001 | Tyagi et al. |
| 6,305,768 B1 | 10/2001 | Nishimoto |
| 6,485,122 B2 | 1/2002 | Wolf et al. |
| 6,390,378 B1 | 5/2002 | Briscoe, Jr. et al. |
| 6,406,449 B1 | 6/2002 | Moore et al. |
| 6,408,841 B1 | 6/2002 | Hirath et al. |
| 6,415,623 B1 | 7/2002 | Jennings et al. |
| 6,428,130 B1 | 8/2002 | Banicevic et al. |
| 6,430,780 B1 | 8/2002 | Kim et al. |
| 6,460,955 B1 | 10/2002 | Vaughan et al. |
| 6,519,919 B1 | 2/2003 | Takenouchi et al. |
| 6,623,413 B1 | 9/2003 | Wynne |
| 6,629,429 B1 | 10/2003 | Kawamura et al. |
| 6,655,766 B2 | 12/2003 | Hodges |
| 6,689,840 B1 | 2/2004 | Eustace et al. |
| 6,716,501 B2 | 4/2004 | Kovalchuk et al. |
| 6,736,472 B2 | 5/2004 | Banicevic |
| 6,749,780 B2 | 6/2004 | Tobias |
| 6,773,082 B2 | 8/2004 | Lee |
| 6,858,280 B2 | 2/2005 | Allen et al. |
| 6,860,082 B1 | 3/2005 | Yamamoto et al. |
| 6,938,968 B2 | 9/2005 | Tanimoto et al. |
| 7,008,032 B2 | 3/2006 | Chekal et al. |
| 7,026,054 B2 | 4/2006 | Ikegawa et al. |
| 7,197,792 B2 | 4/2007 | Moon |
| 7,197,888 B2 | 4/2007 | LeClear et al. |
| 7,207,181 B2 | 4/2007 | Murray et al. |
| 7,210,308 B2 | 5/2007 | Tanimoto et al. |
| 7,234,247 B2 | 6/2007 | Maguire |
| 7,263,744 B2 | 9/2007 | Kim et al. |
| 7,284,390 B2 | 10/2007 | Van Meter et al. |
| 7,296,423 B2 | 11/2007 | Müller et al. |
| 7,316,125 B2 | 1/2008 | Uekado et al. |
| 7,343,757 B2 | 3/2008 | Egan et al. |
| 7,360,371 B2 | 4/2008 | Feinauer et al. |
| 7,449,227 B2 | 11/2008 | Echigoya et al. |
| 7,475,562 B2 | 1/2009 | Jackovin |
| 7,517,031 B2 | 4/2009 | Laible |
| 7,614,244 B2 | 11/2009 | Venkatakrishnan et al. |
| 7,625,622 B2 | 12/2009 | Teckoe et al. |
| 7,641,298 B2 | 1/2010 | Hirath et al. |
| 7,665,326 B2 | 2/2010 | LeClear et al. |
| 7,703,217 B2 | 4/2010 | Tada et al. |
| 7,703,824 B2 | 4/2010 | Kittelson et al. |
| 7,757,511 B2 | 7/2010 | LeClear et al. |
| 7,762,634 B2 | 7/2010 | Tenra et al. |
| 7,794,805 B2 | 9/2010 | Aumaugher et al. |
| 7,815,269 B2 | 10/2010 | Wenning et al. |
| 7,842,269 B2 | 11/2010 | Schachtely et al. |
| 7,845,745 B2 | 12/2010 | Gorz et al. |
| 7,861,538 B2 | 1/2011 | Welle et al. |
| 7,886,559 B2 | 2/2011 | Hell et al. |
| 7,893,123 B2 | 2/2011 | Luisi |
| 7,908,873 B1 | 3/2011 | Cur et al. |
| 7,930,892 B1 | 4/2011 | Vonderhaar |
| 7,938,148 B2 | 5/2011 | Carlier et al. |
| 7,992,257 B2 | 8/2011 | Kim |
| 8,049,518 B2 | 11/2011 | Wern et al. |
| 8,074,469 B2 | 12/2011 | Hamel et al. |
| 8,079,652 B2 | 12/2011 | Laible et al. |
| 8,108,972 B2 | 2/2012 | Bae et al. |
| 8,113,604 B2 | 2/2012 | Olson et al. |
| 8,117,865 B2 | 2/2012 | Allard et al. |
| 8,157,338 B2 | 4/2012 | Seo et al. |
| 8,162,415 B2 | 4/2012 | Hagele et al. |
| 8,163,080 B2 | 4/2012 | Meyer et al. |
| 8,176,746 B2 | 5/2012 | Allard et al. |
| 8,182,051 B2 | 5/2012 | Laible et al. |
| 8,197,019 B2 | 6/2012 | Kim |
| 8,202,599 B2 | 6/2012 | Henn |
| 8,211,523 B2 | 7/2012 | Fujimori et al. |
| 8,266,923 B2 | 9/2012 | Bauer et al. |
| 8,281,558 B2 | 10/2012 | Hiemeyer et al. |
| 8,299,656 B2 | 10/2012 | Allard et al. |
| 8,343,395 B2 | 1/2013 | Hu et al. |
| 8,353,177 B2 | 1/2013 | Adamski et al. |
| 8,382,219 B2 | 2/2013 | Hoffmann et al. |
| 8,434,317 B2 | 5/2013 | Besore |
| 8,439,460 B2 | 5/2013 | Laible et al. |
| 8,456,040 B2 | 6/2013 | Allard et al. |
| 8,491,070 B2 | 7/2013 | Davis et al. |
| 8,516,845 B2 | 8/2013 | Wuesthoff et al. |
| 8,528,284 B2 | 9/2013 | Aspenson et al. |
| 8,590,992 B2 | 11/2013 | Lim et al. |
| 8,717,029 B2 | 5/2014 | Chae et al. |
| 8,739,568 B2 | 6/2014 | Allard et al. |
| 8,752,918 B2 | 6/2014 | Kang |
| 8,752,921 B2 | 6/2014 | Gorz et al. |
| 8,763,847 B2 | 7/2014 | Mortarotti |
| 8,764,133 B2 | 7/2014 | Park et al. |
| 8,770,682 B2 | 7/2014 | Lee et al. |
| 8,776,390 B2 | 7/2014 | Hanaoka et al. |
| 8,840,204 B2 | 9/2014 | Bauer et al. |
| 8,852,708 B2 | 10/2014 | Kim et al. |
| 8,881,398 B2 | 11/2014 | Hanley et al. |
| 8,905,503 B2 | 12/2014 | Sahasrabudhe et al. |
| 8,943,770 B2 | 2/2015 | Sanders et al. |
| 8,944,541 B2 | 2/2015 | Allard et al. |
| 9,009,969 B2 | 4/2015 | Choi et al. |
| RE45,501 E | 5/2015 | Maguire |
| 9,056,952 B2 | 6/2015 | Eilbracht et al. |
| 9,074,811 B2 | 7/2015 | Korkmaz |
| 9,080,808 B2 | 7/2015 | Choi et al. |
| 9,102,076 B2 | 8/2015 | Doshi et al. |
| 9,103,482 B2 | 8/2015 | Fujimori et al. |
| 9,125,546 B2 | 9/2015 | Kleemann et al. |
| 9,140,480 B2 | 9/2015 | Kuehl et al. |
| 9,140,481 B2 | 9/2015 | Cur et al. |
| 9,170,045 B2 | 10/2015 | Oh et al. |
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto et al. |
| 9,429,356 B2 | 8/2016 | Kim et al. |
| 9,448,004 B2 | 9/2016 | Kim et al. |
| 9,463,917 B2 | 10/2016 | Wu et al. |

(56) References Cited

U.S. PATENT DOCUMENTS

| | | |
|---|---|---|
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,833,942 B2 | 12/2017 | Wu et al. |
| 2002/0004111 A1 | 1/2002 | Matsubara et al. |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano et al. |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espindola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer et al. |
| 2007/0176526 A1 | 8/2007 | Gomoll et al. |
| 2007/0264468 A1* | 11/2007 | Boyd .................. B32B 27/32 428/98 |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Nuemann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCraken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Mute et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |

(56) References Cited

U.S. PATENT DOCUMENTS

| | | | |
|---|---|---|---|
| 2016/0258671 A1 | 9/2016 | Allard et al. | |
| 2016/0290702 A1 | 10/2016 | Sexton et al. | |
| 2016/0348957 A1 | 12/2016 | Hitzelberger et al. | |
| 2017/0038126 A1 | 2/2017 | Lee et al. | |
| 2017/0157809 A1 | 6/2017 | Deka et al. | |
| 2017/0176086 A1 | 6/2017 | Kang | |
| 2017/0184339 A1 | 6/2017 | Liu et al. | |
| 2017/0191746 A1 | 7/2017 | Seo | |

FOREIGN PATENT DOCUMENTS

| | | |
|---|---|---|
| CA | 2259665 | 1/1998 |
| CA | 2640006 | 8/2007 |
| CN | 1158509 | 9/1997 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102153829 A * | 8/2011 |
| CN | 102296714 | 12/2011 |
| CN | 102452522 | 5/2012 |
| CN | 102645071 A * | 8/2012 |
| CN | 102717578 A | 10/2012 |
| CN | 102720277 | 10/2012 |
| CN | 103072321 | 5/2013 |
| CN | 202973713 U | 6/2013 |
| CN | 103407228 A * | 11/2013 |
| CN | 203331442 | 12/2013 |
| CN | 104816478 A | 8/2015 |
| CN | 105115221 | 12/2015 |
| CN | 2014963379 U | 1/2016 |
| DE | 1150190 | 6/1963 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0480451 | 4/1992 |
| EP | 0645576 A1 | 3/1995 |
| EP | 0691518 | 1/1996 |
| EP | 0260699 | 3/1998 |
| EP | 0860669 | 8/1998 |
| EP | 1087186 | 3/2001 |
| EP | 1200785 | 5/2002 |
| EP | 1243880 | 9/2002 |
| EP | 1484563 | 12/2004 |
| EP | 1496322 | 1/2005 |
| EP | 1505359 | 2/2005 |
| EP | 1602425 A1 | 12/2005 |
| EP | 1624263 A2 | 8/2006 |
| EP | 2342511 | 7/2011 |
| EP | 2543942 A2 | 1/2013 |
| EP | 2607073 | 6/2013 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 12/1970 |
| JP | S4828353 | 8/1973 |
| JP | S5157777 | 5/1976 |
| JP | S59191588 | 12/1984 |
| JP | 403013779 | 1/1991 |
| JP | 404165197 | 6/1992 |
| JP | 04165197 | 10/1992 |
| JP | 04309778 A | 11/1992 |
| JP | H06159922 | 6/1994 |
| JP | H071479 | 1/1995 |
| JP | H07167377 | 7/1995 |
| JP | H08300052 | 11/1996 |
| JP | H08303686 | 11/1996 |
| JP | H09166271 | 6/1997 |
| JP | H10113983 | 5/1998 |
| JP | 11159693 A | 6/1999 |
| JP | H11311395 | 11/1999 |
| JP | H11336990 | 12/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 3478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006-77792 | 3/2006 |
| JP | 2006161834 A | 6/2006 |
| JP | 2006161945 | 6/2006 |
| JP | 3792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 4779684 | 9/2011 |
| JP | 2011196644 | 10/2011 |
| JP | 2012026493 | 2/2012 |
| JP | 4897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 20080103845 | 11/2008 |
| KR | 20090026045 | 3/2009 |
| KR | 101017776 | 2/2011 |
| KR | 20120007241 | 1/2012 |
| KR | 20120046621 | 5/2012 |
| KR | 20120051305 | 5/2012 |
| KR | 20150089495 A | 8/2015 |
| RU | 547614 | 5/1977 |
| RU | 2061925 C1 | 6/1996 |
| RU | 2077411 C1 | 4/1997 |
| RU | 2081858 | 6/1997 |

(56) References Cited

FOREIGN PATENT DOCUMENTS

| | | |
|---|---|---|
| RU | 2132522 C1 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 648780 A1 | 2/1979 |
| SU | 01307186 A1 | 4/1987 |
| WO | 9721767 | 6/1997 |
| WO | 1998049506 | 11/1998 |
| WO | 02060576 A1 | 4/1999 |
| WO | 9614207 A1 | 4/1999 |
| WO | 9920961 A1 | 4/1999 |
| WO | 9920964 A1 | 4/1999 |
| WO | 199920964 | 4/1999 |
| WO | 200160598 | 8/2001 |
| WO | 200202987 | 1/2002 |
| WO | 2002052208 | 4/2002 |
| WO | 2003072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

CN-103407228-A Macine Translation of Claims.*
CN-102645071-A Machine Translation of Description.*
CN-102153829-A Machine Translation of Description.*
Cai et al., "Generation of Metal Nanoparticles by Laser Ablation of Microspheres," J. Aerosol Sci., vol. 29, No. 5/6 (1998), pp. 627-636.
Raszewski et al., "Methods for Producing Hollow Glass Microspheres," Powerpoint, cached from Google, Jul. 2009, 6 pages.

* cited by examiner

HYBRID PIGMENTED HOT STITCHED COLOR LINER SYSTEM

FIELD OF THE DISCLOSURE

The present disclosure generally relates to liners for appliances. More specifically, the present disclosure generally relates to pigmented liners for appliances.

BACKGROUND

This application relates to liners having particular colors, hues, tints, and the like which are desired for many appliance-related applications, such as refrigeration appliances. As appliance designers have recently placed more emphasis on interior design and lighting (e.g., given the lower energy usage of light-emitting diode (LED) sources), the importance of interior aesthetics has increased for many consumers. Similarly, appliance manufacturers often emphasize aesthetics, including interior design approaches, in attempting to obtain brand differentiation from their competitors.

Liners employed in appliances, including refrigeration appliances, are often produced with extrusion processes. As these liners often are fabricated from two or more layers, conventional approaches to adding color to these liners often involve adding pigments to each extruder employed in making a layer employed in the liner. As pigments are added to multiple extruders, the complexity, repeatability, and manufacturing cost of matching colors increases significantly for a liner that comprises two or more layers having pigments. Further, as significant loadings of pigments in these multi-layer liners are often employed, down-stream processes such as thermal forming used to incorporate the liners into an end product can lead to local discoloration and yield losses. Further, multiple and cost-intensive extrusion runs are often required to fabricate a liner having multiple, extruded layers with pigments that match a particular color, tint, or hue. Still further, these approaches for making a liner having multiple, extruded pigmented layers require one or more adhesives to bond the layers, which increases the cost and can decrease manufacturing yield.

Colored liners currently being utilized in appliances frequently present problems during manufacturing since these liners readily show scratches or defects in the liner surface where the pigment is incorporated. Such scratches imparted on the liner during either the manufacturing process or use by consumers can lead to premature wearing where the inside surface of the refrigeration appliance can look excessively worn or damaged. The flexibility and ability to produce liners where scratches are not readily shown would be beneficial to both manufactures and users for both the production process and downstream aesthetic appearances.

Accordingly, there is a need for methods of making liners, particularly pigmented liners for refrigeration appliances, which are repeatable, with high manufacturing flexibility, and low in cost. There is also a need for pigmented liners that do not readily show scratches or other wear marks that may be transferred to the liner surface during fabrication or consumer use.

SUMMARY OF THE DISCLOSURE

In at least one aspect of the present disclosure, a method of making a liner for an appliance is provided. The method includes mixing a polymeric capping layer precursor and a pigment additive to form a color capping layer; extruding a polymeric base resin to form a polymeric base layer at a base layer formation temperature; and laminating the polymeric base layer and the color capping layer to form the liner at about the base layer formation temperature.

According to another aspect of the present disclosure, a method of making a liner for an appliance is provided. The method includes mixing a polymeric capping layer precursor and a pigment additive to form a color capping layer; extruding a polymeric base layer at a base layer formation temperature into a laminating assembly contemporaneously with the color capping layer to form the liner at about the base layer formation temperature; and forming a textured pattern on an outer surface of the color capping layer.

According to yet another aspect of the present disclosure, a liner for an appliance is provided. The liner includes a polymeric liner that has a bilayer structure. The bilayer structure includes a color capping layer that includes a high-impact polystyrene material and a pigment additive. The bilayer structure also includes a polymeric base layer that includes a high-impact polystyrene material and a polyethylene material. The capping layer and the base layer are directly coupled with substantially no interfaces between them.

These and other features, advantages, and objects of the present device will be further understood and appreciated by those skilled in the art upon studying the following specification, claims, and appended drawings.

BRIEF DESCRIPTION OF THE DRAWINGS

The foregoing summary, as well as the following detailed description of the device, will be better understood when read in conjunction with the appended drawings. For the purpose of illustrating the device, there are shown in the drawings, certain embodiment(s) that are presently preferred. It should be understood, however, that the device is not limited to the precise arrangements and instrumentalities shown. Drawings are not necessary to scale. Certain features of the device may be exaggerated in scale or shown in schematic form in the interest of clarity and conciseness.

In the drawings.

DETAILED DESCRIPTION

Figure 1:
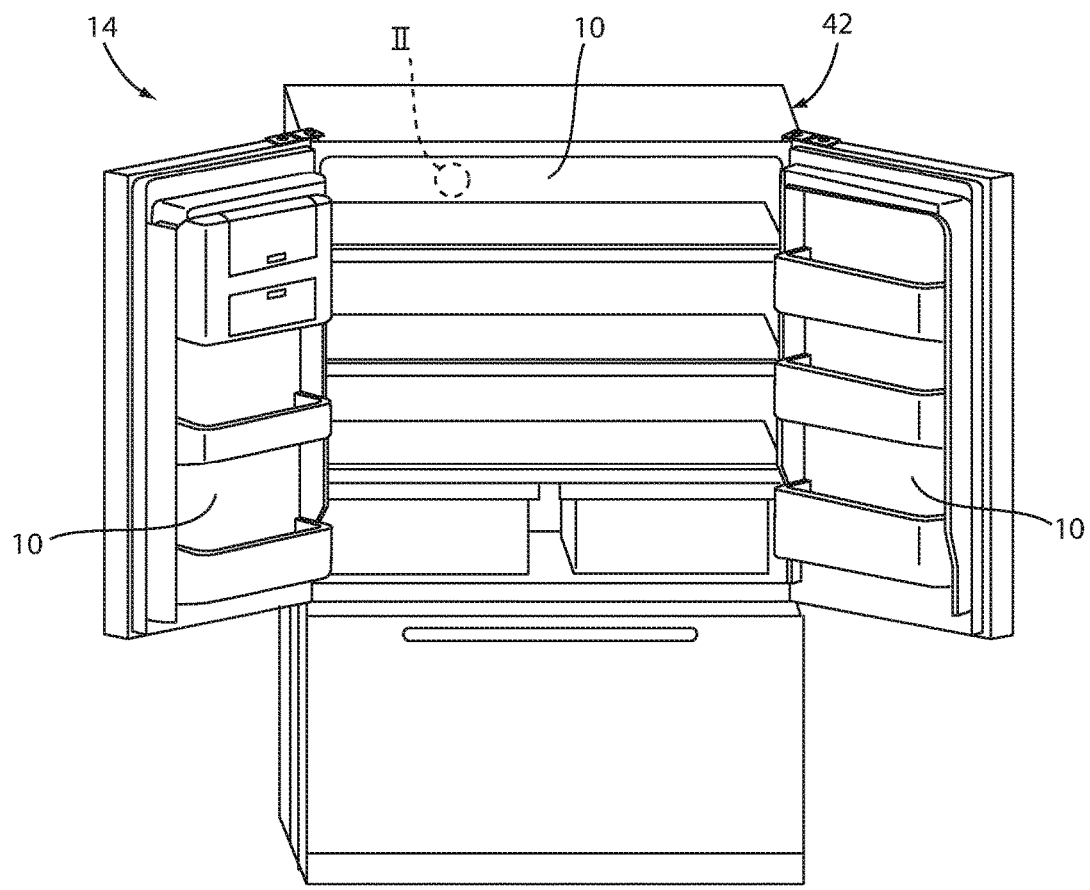
FIG. 1 is a schematic of a refrigeration appliance including a liner according to aspects of the present disclosure.

Before the subject device is described further, it is to be understood that the device is not limited to the particular embodiments of the device described below, as variations of the particular embodiments may be made and still fall within the scope of the appended claims. It is also to be understood that the terminology employed is for the purpose of describing particular embodiments or aspects of embodiments, and is not intended to be limiting. Instead, the scope of the present device will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the device. The upper and lower limits of these smaller ranges may independently be included in the smaller ranges, and are also encompassed within the device, subject to any specifically excluded limit in the stated range. Where the stated range includes one or both of the limits, ranges excluding either or both of those included limits are also included in the device.

In this specification and the appended claims, the singular forms "a," "an" and "the" include plural reference unless the context clearly dictates otherwise.

Referring to FIGS. 1-5, a method 100 of making a liner 10 for an appliance 14 is provided. The method 100 includes mixing a polymeric capping layer precursor 15 and a pigment additive 16 to form a color capping layer 18 (step 104). The method 100 further includes extruding a polymeric base resin 20 to form a polymeric base layer 22 at a base layer formation temperature (step 108). The method 100 may further include laminating a barrier layer 26 between the polymeric base layer 22 and the color capping layer 18 to form the liner 10 at about the base layer formation temperature (step 112). The method may additionally include forming a textured pattern 24 on an outer surface 28 of the color capping layer 18 (step 116). The formed liner 10 includes a capping region 30, an optional barrier region 34, and a base region 38 where the capping region 30 includes the pigment additive 16. The method 100 additionally may include shaping the liner 10 into a final liner 74 at a shaping temperature where the final liner 74 is configured and/or is suitable for assembly into a refrigeration appliance (step 120).

Referring now to FIG. 1, the refrigeration appliance 14 is provided in an exemplary form that includes the liner 10 according to some aspects. As shown, the liner 10 is mounted to a cabinet 42 of the refrigeration appliance 14. In some configurations, the liner 10 is mounted to a foam layer 46 (see FIG. 2) installed on an interior surface of the cabinet 42. In other configurations, the liner 10 may be mounted directly to the cabinet 42. Typically, the liner 10 is attached, coupled, joined, or otherwise fastened to the cabinet 42 through the insulating foam 46, adhesive, bonding agent, mechanical fastener (e.g., rivets, screws, etc.) or another comparable approach. However, the liner 10 itself does not include any internal adhesives and, according to some aspects, includes one or more pigment additives 16 in the color capping layer 18 only (see FIGS. 2A-28).

Figures 2A, 2B:
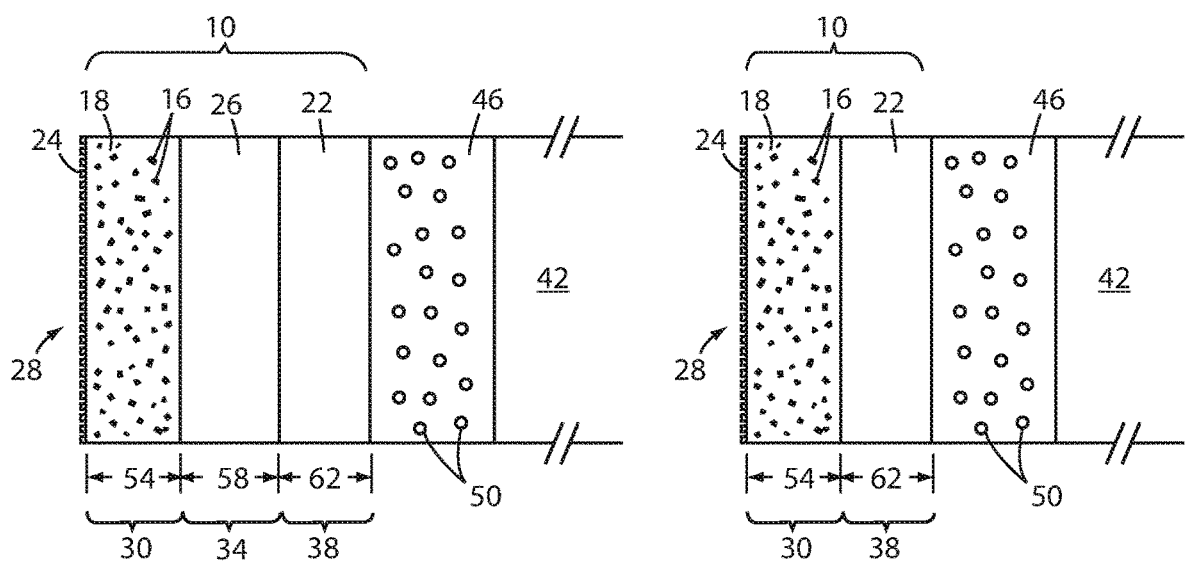
FIG. 2A is a schematic of an enlarged cross-section of the liner at region II marked in FIG. 1 comprising a color capping layer, a barrier layer, and a polymeric base layer, according to some aspects of the present disclosure.
FIG. 2B is a schematic of an enlarged cross-section of the liner at region II marked in FIG. 1 comprising a color capping layer and a polymeric base layer according to some aspects of the present disclosure.

Referring now to FIG. 2A, the liner 10 (e.g., as incorporated into the appliance 14 depicted in FIG. 1) includes the color capping layer 18 and corresponding capping region 30, the polymeric base layer 22 and corresponding base region 38, and the barrier layer 26 and corresponding barrier region 34. The liner 10 and its combination of the barrier layer 26 sandwiched between the color capping layer 18 and polymeric base layer 22 may be positioned directly onto the foam layer 46. In some aspects, the foam layer 46 may include closed-cell and/or open-cell voids, air bubbles, and/or pores 50 distributed evenly throughout the foam layer 46. In some aspects, the foam layer 46 imparts an insulation layer between the liner 10 and the wrapper and/or cabinet 42 of the appliance 14.

The polymeric capping layer precursor used to form the color capping layer 18 may include a high-impact polystyrene (HIPS), polymethylmethacrylate (PMMS), polystyrene (PS), acrylonitrile butadiene styrene (ABS), polyurethane (PU), polypropylene (PP), polyethylene (PE), or combinations thereof. In some aspects, the polymeric capping layer precursor selected for use in the color capping layer 18 may be any known thermoplastic known in the art suitable for use in an extrusion process. In other aspects, the polymeric capping layer precursor used to form the color capping layer 18 may include a high-impact polystyrene (1115 HIPS) precursor material. As also depicted in FIG. 2A, the color capping layer 18 can be configured to have a thickness 54 (e.g., through extrusion, rolling, etc.) of about 0.10 mm to about 1.5 mm. In some aspects, the thickness 54 of the color capping layer 18 may range from about 0.25 mm to about 0.75 mm. Note that the thickness 54 of the color capping layer 18 is given in approximate dimensions, as would be typically associated with the color capping layer 18 being in a sheet or layer form before incorporation into the liner 10. The pigment additive 16 may be incorporated and/or disbursed within the color capping layer 18 at a level sufficient to impart a desired color, hue, tinting, or the like in the liner 10.

Still referring to FIG. 2A, the textured pattern 24 may be positioned on the outer surface 28 of the color capping layer 18 of the liner 10. The textured or granular pattern 24 is beneficial for the color and aesthetic preservation of the liner 10 over time since the textured pattern 24 can help protect the color capping layer 18 from visibly showing scratches, rub marks, gouges, and/or scrapes. The textured pattern 24 may include a variety of different surface patterns formed on the colored capping layer 18, for example, pyramidal, diamond, circular, trapezoidal, square, tetragonal, hexagonal, polygonal, or a combination of shapes thereof. In some aspects, the textured pattern 24 may include a 2D surface pattern, a 3D surface pattern, or a combination thereof. The textured or granular pattern 24 helps prevent visible markings or wear of the outer surface 28 of the liner 10 by offering an alternative to a glossy or smooth finished surface that can readily show marks or wear from the manufacturing process or normal wear. In some aspects, the textured or granular pattern 24 can absorb a scratch, scuff, and/or gouge while the textured pattern 24 can blend in or camouflage the respective mark. In some examples, the textured pattern 24 may be omitted such that the outer surface 28 is provided with a smooth appearance.

Still referring to FIG. 2A, the color capping layer 18 of the liner 10 may include one or more pigment additives 16, configured to impart color, tinting, or the like into the liner 10. As understood by those with ordinary skill in the field of the disclosure, various metallic, ceramic, polymeric pigments, and colorants can be added at various concentrations within the polymeric capping layer precursor employed in the color capping layer 18 of the liner 10. In some aspects, the pigment additive 16 is a granulated pigment. For example, titanium oxide can be included as the pigment additive 16 to achieve a white color. In other aspects, the liner 10 having a charcoal-sparkle appearance can be created by employing carbon black in one or more of quartz, mica, and stainless steel as the pigment additive 16. In some aspects of the disclosure, the pigment additives 16 are incorporated into the capping region 30 of the color capping layer 18 at a concentration level and disbursed to ensure that the liner 10 exhibits a particular color, hue, or the like, as desired by the user of the appliance 14. In some aspects, no additional pigment additives 16 are used, directly or indirectly transferred, and/or incorporated in the base region 38 of the polymeric base layer 22 to obtain the desired color, hue, or tinting for the liner 10. According to other aspects, the pigment additives 16 may be incorporated into the capping region 30 and the base region 38 at concentrations sufficient for the liner 10 to obtain the desired color, hue, or tinting. In some aspects, the mixing step 104 includes mixing the polymeric capping layer precursor with about 5% to about 30% pigment additive 16 by weight of the color capping layer 18. According to some aspects, the pigment additives 16 are incorporated into the capping region 30 of the color capping layer 18 at a concentration from about 10% to about 25% (by weight of the capping layer 18). Optionally, the pigment additives 16 may be incorporated into the capping region 30 at a concentration from about 1% to about 10% (by weight of the capping layer 18). In still other aspects, the concentration of the pigment additive 16 in the capping region 30 of the color capping layer 18 is loaded between about 15% to about 25% (by weight of the capping layer 18) and in the base region 38 of the polymeric base layer 22, if present, from about 3% to about 5% (by weight of the base layer 22). In some aspects, the color capping layer comprises from about 70% to about 95% by weight polymeric capping layer precursor and from about 5% to about 30% pigment additive by weight.

Still referring to FIG. 2A, the barrier layer 26 and corresponding barrier region 34 may help protect the liner 10 from wrinkling, deformations, and/or delamination effects caused during manufacturing or end use. In some aspects, the barrier layer 26 may prevent the diffusion of volatiles and other potential contaminants associated with injecting the foam 46 positioned between the liner 10 and the cabinet 42. In some aspects, the contaminants associated with the foam 46 that could discolor or lead to other deteriorating defects in the liner 10 have no negative effects on the color capping layer 18 disclosed herein. The barrier layer 26 may be sandwiched directly between the color capping layer 18 and polymeric base layer 22 to form the liner 10 with no additional adhesives and/or bonding agents used between the respective layers 18, 22, 26. In some aspects, the barrier region 34 includes a polyethylene material used in combination with a material employed in the base region 38, typically a material comparable to that employed in the capping layer 18 or capping region 30, e.g., a high-impact polystyrene (HIPS). In some aspects, the barrier layer 26 may be formed using a low density polyethylene, a high density polyethylene, a polypropylene, a polycarbonate, a polyester, a polyamide, a polystyrene, a high-impact polystyrene (HIPS), or a combination thereof. According to some aspects, additional compatibilizers, as understood by those with ordinary skill in the art, are added to the barrier region 34 to ensure that the polyethylene layers and HIPS material within the barrier region 34 are combined without the formation of voids, bubbles, delamination defects, etc. In some aspects, the barrier region 34 may include one or more barrier layers 26 comprising a polyethylene material, layered on the respective material of the base layer 22. As also depicted in FIG. 2, the barrier region 34 of the barrier layer 26 can be configured with a thickness 58 (e.g., through extrusion, rolling, etc.) of about 0.10 mm to about 1.5 mm. In some aspects, the barrier layer 26 has a thickness 58 of about 0.25 mm to about 0.75 mm. Note that the thickness 58 of the barrier layer 26 is given in approximate dimensions, as would be typically associated with the barrier layer 26 being in a sheet or layer form before incorporation into the liner 10.

Referring to FIG. 2A, the polymeric base layer 22 may provide structural support to the liner 10 in addition to spacing the pigment additives 16 of the color capping layer 18 away from the surface of the liner 10. By putting distance or space between the outer surface of the liner 10 and the color capping layer 18, no contact may be made between the more delicate colored capping layer 18 and the user and/or potential food products stored in the appliance 14. The polymeric base resin 20 used to form the base region 38 of the polymeric base layer 22 may include a high-impact polystyrene (HIPS), polymethylmethacrylate (PMMS), polystyrene (PS), acrylonitrile butadiene styrene (ABS), polyurethane (PU), polypropylene (PP), polyethylene (PE), or combinations thereof. In some aspects, the polymeric base resin 20 selected for use in the base layer 22 are thermoplastics, suitable for use in an extrusion process. In other aspects, the polymeric base resin 20 (see FIGS. 4A and 4B) used to form the polymeric base layer 22 may include a high-impact polystyrene (1170 HIPS) precursor material. As also depicted in FIG. 2A, the base region 38 of the polymeric base layer 22 can be configured with a thickness 62 (e.g., through extrusion, rolling, etc.) of about 0.10 mm to about 1.5 mm. In some aspects, the polymeric base layer 22 has thickness 62 of about 0.25 mm to about 0.75 mm. Note that the thickness 62 of the base layer 22 is given in approximate dimensions, as would be typically associated with the polymeric base layer 22 being in a sheet or layer form before incorporation into the liner 10.

Still referring to FIG. 2A, the liner 10 is configured such that the capping region 30, the barrier region 34, and the base region 38 (i.e., for liner 10) are joined with substantially no interfaces between them. The term "interface", as defined herein, is meant to include boundaries marked by structural defects such as cracks, folds, or bubbles where two layers (e.g. 18, 22, and 26) meet and interact. When layers made from different polymeric materials (e.g. 18, 22, and/or 26) are laminated together, the blending of the respective polymeric materials at the junction between the layers is not considered an "interface" because the boundary is not marked by one or more defects that may lead to a decrease in structural integrity. In some aspects, the liner 10, including the capping region 30, the barrier region 34, and/or the base region 38 are joined with substantially no interfaces between the respective layers forming a uniform bilayer or trilayer with the appearance of a monolayer. That is, a cross-section of the liner 10 when viewed under low magnification will not reveal any indications of an interface or interfaces between the capping region 30, the barrier region 34, and/or the base region 38. Advantageously, the lack of any appreciable interfaces between these two or three regions significantly reduces the likelihood that these regions will delaminate during subsequent processing (e.g., thermal-forming of the liner 10 into a refrigeration appliance 14, such as depicted in FIG. 1) and other demands of the application environment of the liner 10. Another advantage of these liners 10 is that the base region 38, the barrier region 34, and/or the capping region 30 for the liner 10 are configured with substantially no interfaces between them, thus eliminating the necessity of employing adhesives or other bonding agents to join them. As these implementations of the liner 10 do not require adhesives, they can be fabricated, e.g. through lamination processes, at a lower cost and using faster fabrication processes. Further, the lack of adhesives employed between these regions tends to result in improved color uniformity for these liners 10 in comparison to conventional, pigmented multi-layer liners with layers joined with internal adhesives. In some aspects, the interfaces between the barrier layer 26 and the base layer 22, the barrier layer 26 and the capping layer 18, and/or between the base layer 22 and the capping layer 18 include a polymer blend where the respective polymeric resins used in the respective layers flow and mix to form the corresponding polymer blends at the interface.

Figure 2C:
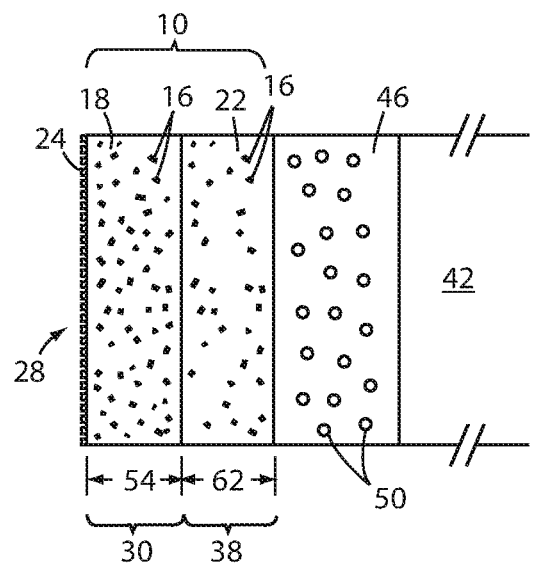
FIG. 2C is a schematic view on an enlarged cross-section of the liner at region II marked in FIG. 1 comprising a color capping layer and a pigmented polymeric base layer according to some aspects of the present disclosure.

Referring now to FIGS. 2B and 2C, in some aspects, the liner 10 may not include the barrier layer 26 and corresponding barrier region 34. The liner 10 without the barrier layer 26 includes the color capping layer 18 having pigment additives 16 evenly dispersed throughout. The color capping layer 18 additionally includes the outer surface 28 having the textured pattern 24 and an inner surface directly coupled or layered onto the polymeric base layer 22. The polymeric base layer 22 may be positioned directly onto the foam layer 46 having one or more voids 50 where the foam layer 46 is sandwiched directly between the polymeric base layer 22 and the wrapper and/or cabinet 42. In some examples, the base layer 22 may include the pigment additives 16 dispersed throughout. For example, the base layer 22 may be provided with a lower concentration of the pigment additive 16 than the concentration that is provided in the color capping layer 18. In one specific example, the color capping layer 18 may be provided with a composition of 70% HIPS and 30% pigment additive 16 while the base layer 22 is provided with a composition of 70% HIPS and 30% PE mixture, where the PE mixture has a composition of 96% PE and 4% pigment additive 16. However, the present disclosure is not so limited. For example, the PE mixture may be provided with a composition that utilizes the pigment additive 16 at a concentration of at least about 1%, at least about 5%, at least about 10%, at least about 15%, at least about 20%, at least about 25%, at least about 30%, and/or combinations or ranges thereof, with a balancing concentration of polyethylene (PE). It may be beneficial to provide the pigment additive 16 in the base layer 22 at a concentration that is equal to, or generally corresponds with (e.g., within about 10%), the concentration of the pigment additive 16 in the color capping layer 18. The capping layer thickness 54 and base layer thickness 62 may include the same thickness values described herein. Advantages of not using the barrier layer 26 in the liner 10 can include a reduction in weight, a reduction in liner 10 thickness, and/or a simpler and more efficient manufacturing process.

Figure 3A:
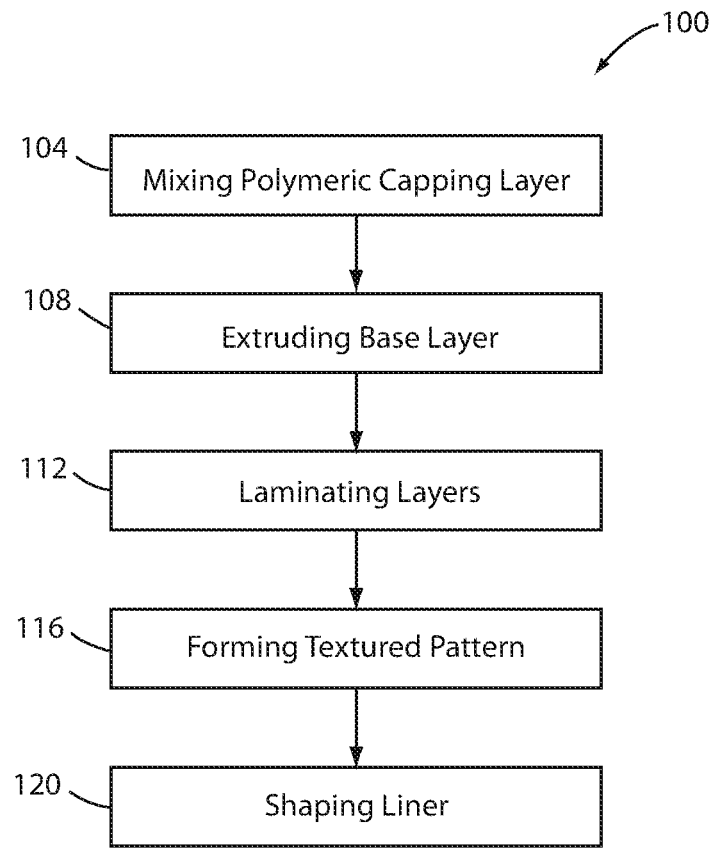
FIG. 3A is a flow-chart schematic of a method for making a liner for an appliance according to some aspects of the present disclosure.
Figure 3B:
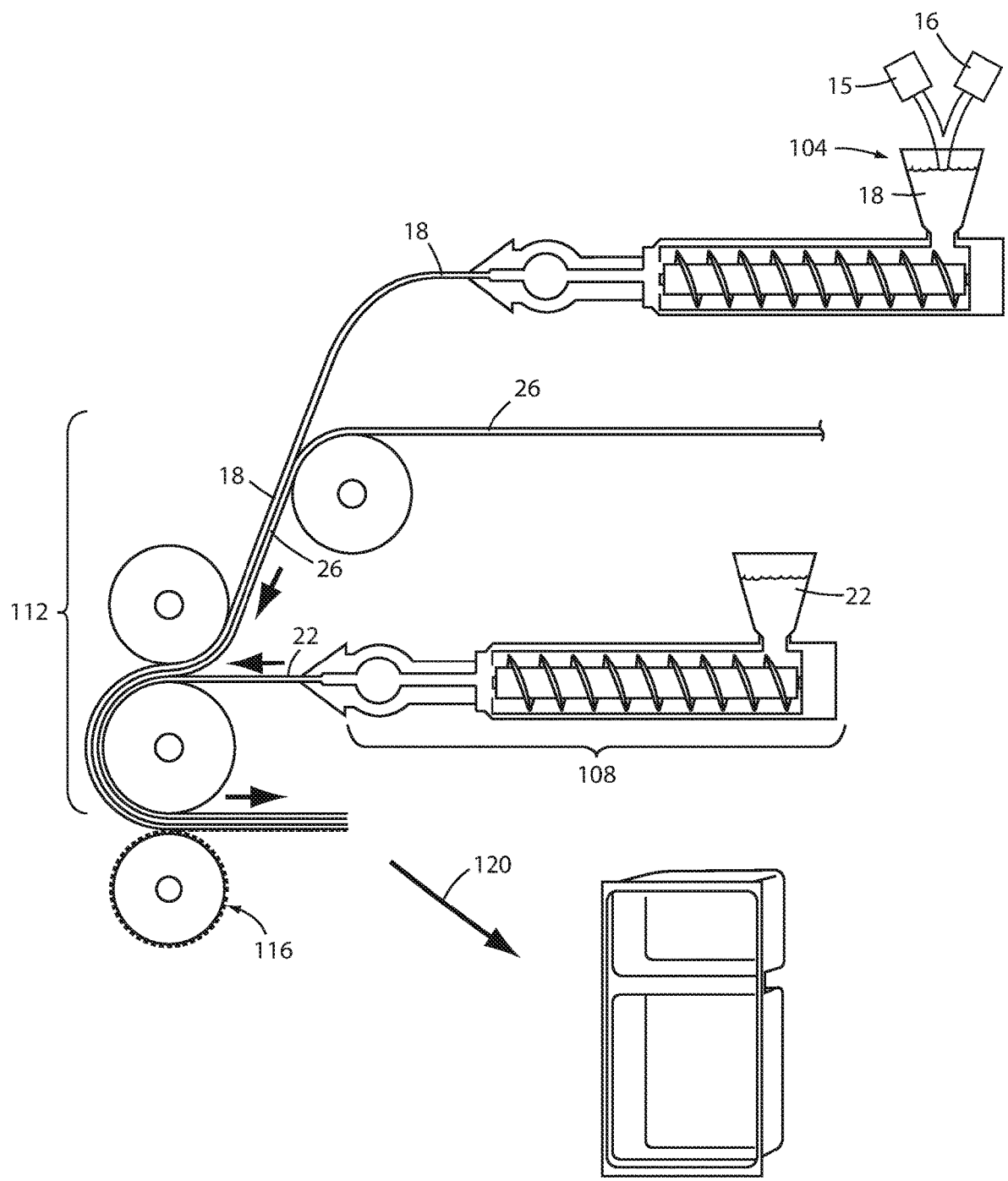
FIG. 3B is an illustrated schematic of the method for making a liner for an appliance according to some aspects of the present disclosure.

Referring now to FIGS. 3A and 3B, the method 100 of making the liner 10 for the refrigeration appliance 14 is depicted in schematic form. The method 100 includes the mixing step 104 for mixing the polymeric capping layer precursor and the pigment additive 16 to form the color capping layer 18. In some aspects, the mixing step 104 includes mixing the polymeric capping layer precursor with about 5% to about 30% pigment additive 16 by weight or from about 15% to about 25% pigment additive 16 by weight of the capping layer 18. The mixing step 104, for example, can be conducted within an extruder or in a separate vessel or container. According to some aspects, the mixing step 104 is conducted such that the polymeric capping layer precursor and the pigment additive 16 are mixed in particulate form. In some aspects, the mixing step 104 is conducted such that the color capping layer 18 exhibits a predetermined color. In some aspects, the color capping layer 18 includes the polymeric capping layer precursor from about 50% to about 98% by weight, from about 60% to about 95% by weight, from about 70% to about 95% by weight, or from about 75% to about 95% by weight of the color capping layer 18.

Referring again to FIGS. 3A and 3B, the method 100 of making the liner 10 for the appliance 14 further includes the extruding step 108 for forming the polymeric base layer 22. In some aspects, the extruding step 108 is conducted in an extruder suitable for extrusion of thermoplastic materials into polymeric layers. According to some aspects, the base layer formation temperature is set between about 120° F. to about 425° F., about 120° F. to about 160° F., from about 275° F. to about 400° F., or from about 290° F. to about 370° F. In other aspects, the extruding step 108 is conducted with other apparatuses to accomplish the same or similar function as would be understood by those with ordinary skill in the art, e.g., hot-pressing apparatus, injection molding apparatus, etc.

Still referring to FIGS. 3A and 3B, the method 100 of making the liner 10 of the appliance 14 further includes the laminating step 112 for laminating the barrier layer 26 between the color capping layer 18 and the polymeric base layer 22 to form the liner 10 at about the base layer formation temperature. According to some aspects of the disclosure, the laminating step 112 of the method 100 is conducted by using rollers, e.g. one or more calendaring rollers 70 (see FIGS. 4A and 4B). Accordingly, the laminating step 112 using rollers can involve rolling the polymeric base layer 22, the color capping layer 18, and the barrier layer 26 together, at about the base layer formation temperature to form the liner 10. By rolling these layers together at about the same temperature in which they were extruded or otherwise processed in earlier steps, the laminating step 112 ensures that these layers are joined together with substantially no interfaces between them. In some aspects, the liner 10 can be characterized as a bilayer or trilayer appearing as a monolayer having substantially no interfaces between the two or three respective regions 30, 34, and/or 38. In some aspects, the lamination step 112 is conducted to form the liner 10 having substantially no interfaces between the capping region 30, the barrier region 34, and the base region 38. In some aspects, the laminating step is conducted such that the color capping layer 18 exhibits a predetermined color.

In some aspects, the lamination step 112 can be heated to about the base layer formation temperature, e.g., about 275° F. to about 400° F. That is, a temperature that is about the base layer formation temperature allows for efficient laminating of the respective layers 18, 22, and 26. In some aspects, temperatures considered "about the base layer formation temperature" include temperatures less than or equal to 3° F., less than or equal to 5° F., less than or equal to 10° F., or less than or equal to 15° F. of the melting temperature of the polymeric base resin 20 or blend used. The pressure applied by the rollers in the lamination step 112, and the fact that the rollers are set to approximately the base layer formation temperature, ensures that the capping layer 18, base layer 22 and barrier layer 26 are merged together during the lamination step 112 to form the uniform liner 10.

Figure 5:
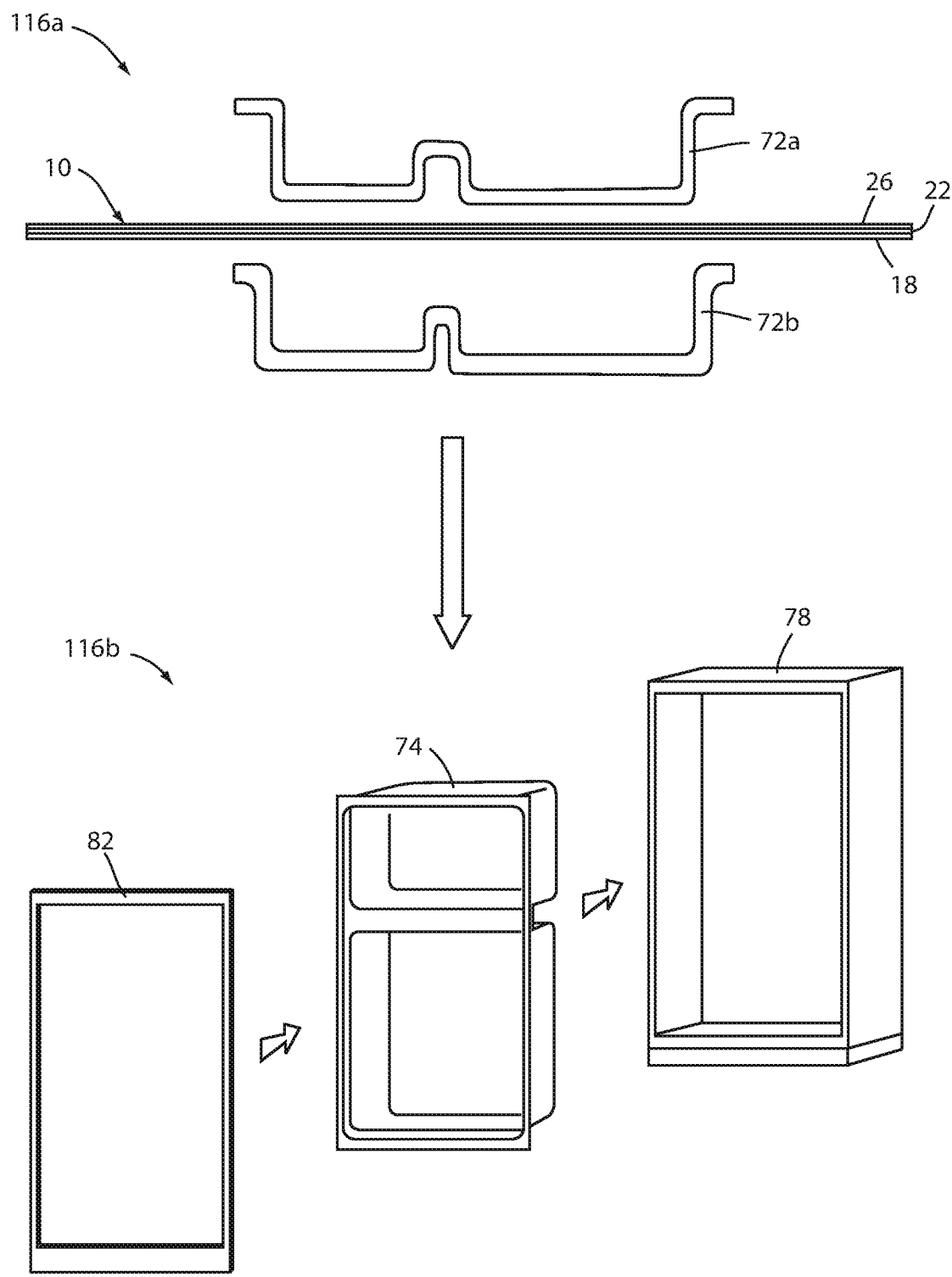
FIG. 5 is a schematic for shaping the liner into a final liner to be installed in a refrigeration appliance according to some aspects of the present disclosure.

Referring again to FIGS. 3A and 3B, the method 100 of making the liner 10 can be conducted with an additional shaping step (step 120) after formation of the liner in steps 104, 108, 112, and 116. Step 116 may include sub-steps 116a and 116b, as depicted in FIG. 5 according to some aspects of the present disclosure. Referring now to FIG. 5, the step 120 of method 100 can be conducted by shaping the liner 10 into a final liner 74 using a shaping temperature suitable for subsequent assembly into the refrigeration appliance. To impart a desired shape to the liner 10, the liner 10 may be heat pressed or compression molded between a heated top mold 72a and a heated bottom mold 72b (step 120a). The final liner 74 is formed to a desired shape/design and is configured for assembly into the appliance 14 (e.g., the refrigeration appliance 14 as shown in FIG. 1). In some aspects, the shaping step 120 is conducted according to a thermal-forming process, typically at a temperature that approaches, but does not exceed, the base layer formation temperature, employed in earlier steps of the method 100. In some aspects, the shaping temperature of the shaping step may range between temperatures from about 200° F. to about 350° F.

Figure 4A:
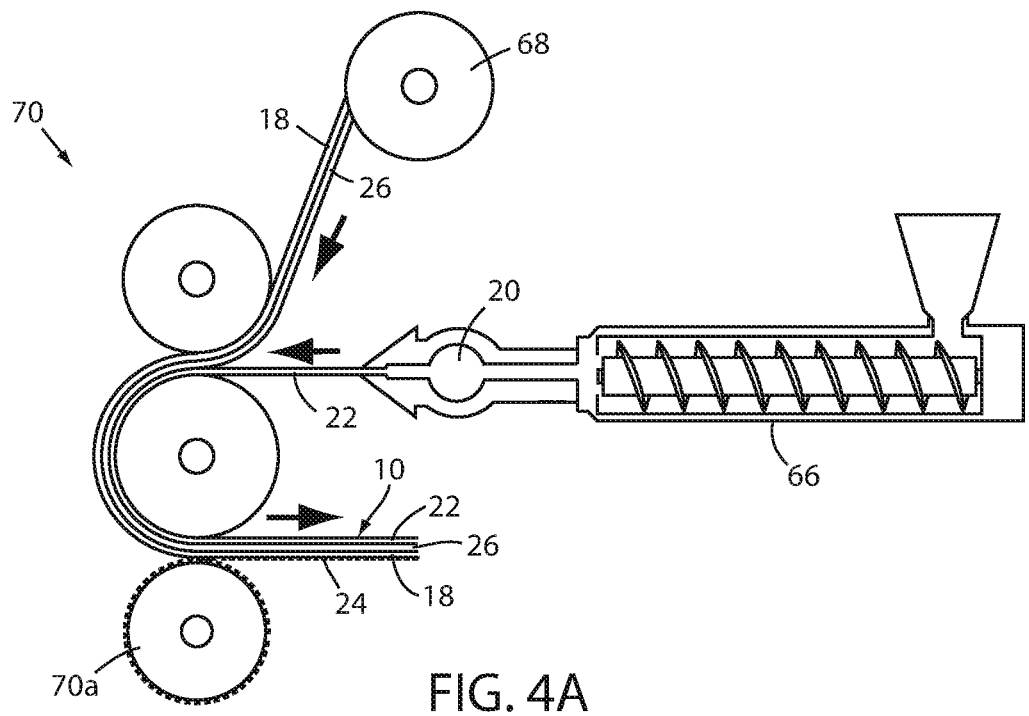
FIG. 4A is a schematic of a hot lamination process according to some aspects of the present disclosure.
Figure 4B:
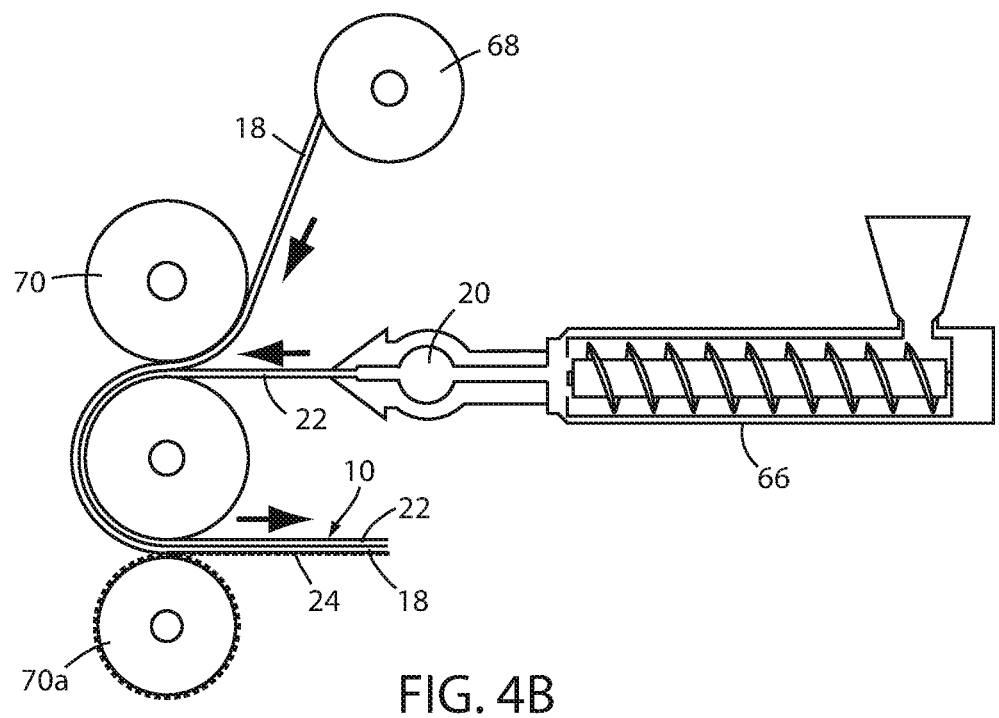
FIG. 4B is a schematic of a hot lamination process according to other aspects of the present disclosure.

Referring now to FIGS. 4A and 4B, in some aspects, the method 100 of making the liner 10 of the appliance 14 may reduce energy usage and timing needs by directly extruding the polymeric base resin 20 and corresponding polymeric base layer 22 into a laminating assembly 64. In these aspects, as the polymeric base layer 22 is freshly formed using an extruder 66 where the polymeric base layer 22 is still hot from the extrusion and forming processes, the polymeric base layer 22 is directly positioned into the laminating assembly 64 contemporaneously with the color capping layer 18 and barrier layer 26 loaded from a pulley roller 68 to be laminated into the liner 10 using one or more rollers 70. At least one of the advantages of laminating the freshly formed and still hot polymeric base layer 22 with the color capping layer 18 and barrier layer 26 is the ability to save energy from not having to heat each of the respective layers 18, 22, 26 to about the base layer formation temperature. Since the temperature of the polymeric base layer 22 is about the base layer formation temperature upon being formed, the polymeric base layer 22 may be readily laminated to the barrier layer 26 and color capping layer 18 to form the liner 10 with substantially no interfaces between the respective layers (see FIG. 2A). In some aspects, no barrier layer 26 may be incorporated and the polymeric base layer 22 may be readily and directly laminated to the color capping layer 18 to form the liner 10 with substantially no interfaces between the respective layers (see FIG. 2B). In some aspects, the base layer formation temperature may be from about 120° F. to about 160° F., from about 125° F. to about 350° F., from about 175° F. to about 325° F., or from about 200° F. to about 275° F. In some aspects, the base layer formation temperature is above their glass transition temperature for amorphous polymers or when the amorphous polymer begins to flow and/or above their melting point for crystalline polymers or when the crystalline polymer begins to flow.

Still referring to FIGS. 4A and 4B, the method 100 of making the liner 10 includes forming the textured pattern 24 on the outer surface 28 on the color capping layer 18 (step 116). In some aspects, the textured pattern 24 may be formed into the outer surface 28 on the color capping layer 18 using a granular pattern mold roller 70a. Depending on the desired aesthetic and color appearance desired for the liner 10, the granular pattern mold roller 70a can be configured to impart or mold, for example, pyramidal, diamond, circular, trapezoidal, square, tetragonal, hexagonal, polygonal, or a combination of shapes thereof into the outer surface 28 of the color capping layer 18. In some aspects, the textured pattern 24 may include a 2D surface pattern, a 3D surface pattern, or a combination thereof. The added textured or granular pattern 24 helps maintain color, prevent visible markings, and/or prevent visible wear of the outer surface 28 of the liner 10 by offering an alternative to a glossy or smooth finished surface that readily can show marks or wear from the manufacturing process or normal wear.

Referring further to FIGS. 4A and 4B, in some aspects of the present disclosure, the liner 10 is provided with the color capping layer 18 and the base layer 22 while the barrier layer 26 is excluded. The polymeric base resin 20 used to form the polymeric base layer 22 may include a high-impact polystyrene (HIPS) precursor material, such as 1170 HIPS, as well as polyethylene (PE). For example, the base layer 22 may include a mixture of 70% high-impact polystyrene (HIPS) and a polyethylene (PE) mixture. The polyethylene (PE) mixture may include a loading concentration of high-impact polystyrene (HIPS). For example, the polyethylene (PE) mixture may include a loading concentration of high-impact polystyrene (HIPS) of at least about 2% HIPS, at least about 4% HIPS at least about 6% HIPS, at least about 8% HIPS, at least about 10% HIPS, at least about 12% HIPS, at least about 14% HIPS, at least about 16% HIPS, at least about 18% HIPS, at least about 20% HIPS, and/or combinations or ranges thereof. Accordingly, one specific example of the composition of the base layer 22 may be 70% HIPS and 30% PE mixture, where the PE mixture has a composition of 90% PE and 10% HIPS by weight. The color capping layer 18 may have a composition similar to those described herein, such as high-impact polystyrene (HIPS) with a loading concentration of the pigment additive 16 (see FIG. 2B). For example, the color capping layer 18 may be made with a composition that includes high-impact polystyrene (HIPS) at a concentration in the range of at least about 70% to less than about 99% and a loading of the pigment additive 16 of at least about 1% to less than about 30%.

Referring still further to FIGS. 4A and 4B, in some aspects of the present disclosure, the color capping layer 18 and the base layer 22 may each be provided with the pigment additive 16 (see FIG. 2C). In such an example, the base layer 22 may be provided with a lower concentration of the pigment additive 16 than the concentration that is provided in the color capping layer 18. In one specific example, the color capping layer 18 may be provided with a composition of 70% HIPS and 30% pigment additive 16 while the base layer 22 is provided with a composition of 70% HIPS and 30% PE mixture, where the PE mixture has a composition of 96% PE and 4% pigment additive 16. However, the present disclosure is not so limited. For example, the PE mixture may be provided with a composition that utilizes the pigment additive 16 at a concentration of at least about 1%, at least about 5%, at least about 10%, at least about 15%, at least about 20%, at least about 25%, at least about 30%, and/or combinations or ranges thereof, with a balancing concentration of polyethylene (PE). It may be beneficial to provide the pigment additive 16 in the base layer 22 at a concentration that is equal to, or generally corresponds with (e.g., within about 10%), the concentration of the pigment additive 16 in the color capping layer 18. The color capping layer 18 may be provided with any of the compositions disclosed herein, including combinations thereof without departing from the concepts disclosed herein. Additionally, the base layer 22 may be provided with any one of the compositions disclosed herein or combinations thereof. Further, the base layer 22 may be provided with a composition that is a hybrid of the compositions disclosed herein for the color capping layer 18, the base layer 22, and/or the barrier layer 26. By providing the base layer 22 with the pigment additive 16, in the event of defects or deformations to the liner 10, the defects or deformations may be at least partially blended with the surrounding area such that the defect or deformation remains hidden or barely perceptible to the user.

One function of the barrier layer 26, is to protect the color capping layer 18 from defects and deformations that result from the foam layer 46 attacking or degrading the base layer 22. The foam layer 46, in some instances, can penetrate through the base layer 22 and interact directly with the barrier layer 26. In the bilayer examples disclosed herein, the barrier layer 26 is omitted. Accordingly, the foam layer 46 may pose a greater threat to the integrity of the color capping layer 18 if the foam layer 46 is allowed to interact with the color capping layer 18. Therefore, the formulation of the base layer 22 in its various aspects and examples has been designed as a hybrid composition that may be provided with characteristics of both the base layer 22 and the barrier layer 26 while remaining a uniform composition. By adjusting the composition of the base layer 22, the foam layer 46 is not permitted to reduce the thickness of the liner 10 prior to the progress of the foam layer 46 being halted by the barrier layer 26. Instead, the base layer 22 immediately resists the progress of the foam layer's 46 degradation of the liner 10. An additional advantage of the bilayer structure is that the color capping layer 18 and the base layer 22 are more suitable for regrinding of scrap material such that manufacturing costs are reduced. In addition to significant manufacturing cost savings by opening the possibility for regrinding of scrap material, the present disclosure significantly reduces the complexity of the production process by laminating the liner 10 as a bilayer. By laminating two layers together rather than three, fewer opportunities exist for defects, deformations, and imperfections in the liner 10. For example, laminating a third layer onto a bilayer can result in deformations in not only the junction between the third layer and the bilayer, but also can result in a disruption in the junction between first and second layers that have already been laminated into the bilayer. The use of the bilayer and the hybrid composition for the base layer 22 are able to decrease cost and waste while maintaining or improving a lifecycle of the liner 10, which ultimately can decrease costs associated with recalls and/or warranty repairs. The hybrid composition of the base layer 22 prevents deformation, defects, and general depolymerization or dissolving of the base layer 22 that can result from insulating foams that are often utilized in the appliance 14. Accordingly, the hybrid composition of the base layer 22 can reduce or eliminate the drawbacks of utilizing a separate barrier layer 26 while maintaining the benefits provided by the barrier layer 26.

Trilayer structures that employ the barrier layer 26 may be provided with compositions that include a mixture of polyethylene (PE) and polyethylene terephthalate (PET). For example, the barrier layer 26 may be provided with a composition of 90% PE (e.g., 1170 HIPS) and 10% PET. While the incorporation of the barrier layer 26 helps to protect against wrinkling and other deformations, the barrier layer 26 can introduce difficulties with manufacturing, costs, and performance of the liner 10. For example, the barrier layer 26 is often blended and produced as a separate layer for the trilayer structures, which increases costs, and the barrier layer 26 is often difficult or impossible to regrind when issues arise. When polyethylene terephthalate (PET) is present in the barrier layer 26, and the scrap barrier layer 26 is mixed with the color capping layer 18 and/or the base layer 22 for remanufacturing, then serious issues arise with thermoforming and color matching of the liner 10.

Referring to FIG. 5, the final liner 74 may be assembled with a wrapper 78 (e.g. the cabinet 42 as shown in FIG. 1) and a trim breaker 82 to form an insulation structure (step 120b). The insulation structure may then be filled with the foam layer 46 or other insulative material known in the art to form the fully insulated cabinet 42 structure.

The method 100 of making liners 10 and their corresponding bilayer or trilayer structures result in liners 10 having better surface properties to prevent scratching or other visible aberrations of the color and/or texture. For example, the barrier layer 26 in combination with the textured pattern 24 positioned on the outer surface 28 of the liner 10 hides visible scratches or markings on the color capping layer 18. The ability to position the pigment additive 16 and the color capping layer 18 on one side of the liner 10 with the textured pattern 24 positioned on the outer surface 28 of the liner 10 allows the imparted color, tinting, hue or the like from visibly showing damage during the manufacturing or end use of the appliance 14.

It is understood that the descriptions outlining and teaching the method of making the liner 10 previously discussed, which can be used in any combination, apply equally well to the liner 10 for the appliance 14. Accordingly, the liner 10 includes a polymeric liner having the bilayer or trilayer structure where the bilayer or trilayer structure includes: the color capping layer 18 including a high-impact polystyrene material and the pigment additive 16 wherein the outer surface 28 of the color capping layer 18 may include the textured pattern 24; the polymeric base layer 22 including a high-impact polystyrene material and optionally the pigment additive 16; and, in some examples, the barrier layer 26 including a polyethylene material wherein the barrier region 34 is disposed between the color capping layer 18 and the polymeric base layer 22. The color capping layer 18, barrier layer 26, and the polymeric base layer 22 are directly coupled with substantially no interfaces between them in the trilayer structure. The color capping layer 18 and the polymeric base layer 22 are directly coupled with substantially no interfaces between them in the bilayer structure.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. A method of making a liner for an appliance, the method comprising:
    mixing a polymeric capping layer precursor and a pigment additive to form a color capping layer such that a pigment concentration in the color capping layer is at least about 10% by weight;
    extruding a polymeric base resin to form a polymeric base layer at a base layer formation temperature, wherein the polymeric base layer comprises from about 1% to about 30% of the pigment additive by weight; and
    laminating the polymeric base layer and the color capping layer to form the liner at about the base layer formation temperature.

2. The method according to claim 1, wherein the color capping layer and the polymeric base layer are each formed using at least one of a high-impact polystyrene (HIPS), polymethylmethacrylate (PMMS), polystyrene (PS), acrylonitrile butadiene styrene (ABS), polyurethane (PU), polypropylene (PP), polyethylene (PE), or a combination thereof.

3. The method according to claim 1, wherein the color capping layer comprises from about 70% to about 90% by weight polymeric capping layer precursor and from about 10% to about 30% pigment additive by weight.

4. The method according to claim 1, wherein the base layer formation temperature is from about 120° C. to about 160° C.

5. The method according to claim 1, wherein the mixing step is conducted with an extruder and the laminating step is conducted with one or more calendaring rollers.

6. The method according to claim 1, further comprising:
    forming a textured pattern on an outer surface of the color capping layer.

7. The method according to claim 1, wherein the mixing and the laminating steps are conducted such that the color capping layer exhibits a predetermined color.

8. The method according to claim 1, further comprising:
    shaping the liner into a final liner at a shaping temperature wherein the final liner is suitable for assembly into a refrigeration appliance.

9. The method according to claim 1, wherein a thickness of the color capping layer is between about 0.10 mm and less than 1.0 mm.

10. The method according to claim 1, wherein the step of laminating the polymeric base layer and the color capping layer to form the liner at about the base layer formation temperature is performed as a hot lamination process.

11. A method of making a liner for an appliance, the method comprising:
    mixing a polymeric capping layer precursor and a pigment additive to form a color capping layer such that a pigment concentration in the color capping layer is at least about 10% by weight, wherein a thickness of the color capping layer is between about 0.10 mm and less than 1.0 mm;
    extruding a polymeric base resin to form a polymeric base layer at a base layer formation temperature, wherein the polymeric base layer comprises from about 1% to about 30% of the pigment additive by weight; and
    laminating the polymeric base layer and the color capping layer to form the liner at about the base layer formation temperature.

12. The method according to claim 11, wherein the color capping layer comprises from about 70% to about 90% by weight polymeric capping layer precursor and from about 10% to about 30% pigment additive by weight.

13. The method according to claim 11, wherein the step of laminating the polymeric base layer and the color capping layer to form the liner at about the base layer formation temperature is performed as a hot lamination process.

14. The method according to claim 11, wherein the base layer formation temperature is from about 120° C. to about 160° C.

15. A method of making a liner for an appliance, the method comprising:
    mixing a polymeric capping layer precursor and a pigment additive to form a color capping layer such that a pigment concentration in the color capping layer is at least about 10% by weight, wherein a thickness of the color capping layer is between about 0.10 mm and less than 1.0 mm;
    extruding a polymeric base resin to form a polymeric base layer at a base layer formation temperature, wherein the polymeric base layer comprises from about 1% to about 30% of the pigment additive by weight; and
    laminating the polymeric base layer and the color capping layer to form the liner at about the base layer formation temperature, wherein the laminating is performed as a hot lamination process.

16. The method according to claim 15, wherein the color capping layer comprises from about 70% to about 90% by weight polymeric capping layer precursor and from about 10% to about 30% pigment additive by weight.

17. The method according to claim 15, wherein the base layer formation temperature is from about 120° C. to about 160° C.

* * * * *